UNITED STATES PATENT OFFICE.

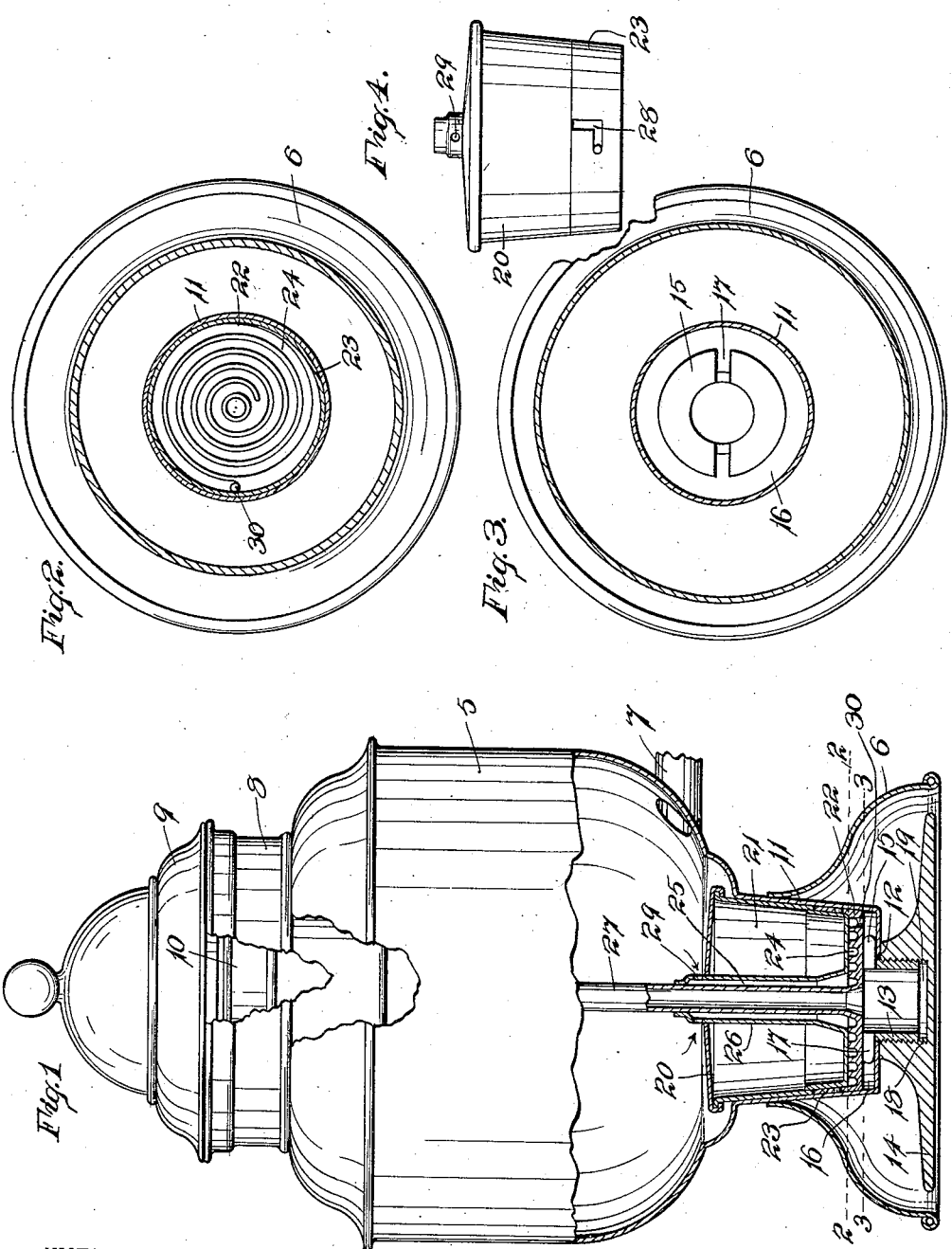

ISRAEL GEFTER, OF MERIDEN, CONNECTICUT.

PERCOLATOR.

1,077,063.  Specification of Letters Patent.  Patented Oct. 28, 1913.

Application filed May 25, 1911. Serial No. 629,346.

*To all whom it may concern:*

Be it known that I, ISRAEL GEFTER, a subject of the Czar of Russia, and a resident of Meriden, in the county of New Haven and State of Connecticut, have invented a new and Improved Percolator, of which the following is a specification.

My invention relates to the class of devices used in the preparation of beverages, more especially coffee, and the object of my invention among others is to provide a device of this class that shall be extremely efficient and rapid in operation.

One form of device embodying my invention, and in the use of which the object above mentioned may be attained, as well as others which will appear from the following description, is illustrated in the accompanying drawings, in which—

Figure 1 is a view in side elevation of an urn embodying my invention with parts broken away to show construction. Fig. 2 is a view in cross section on plane denoted by dotted line 2—2 of Fig. 1. Fig. 3 is a detail view in cross section on plane denoted by dotted line 3—3 of Fig. 1. Fig. 4 is a detail side view of the fountain.

While my invention may be embodied in different forms of devices for preparing beverages, as it finds ready adaptation in an urn employed for such purpose, I have selected such for the purpose of illustration and description of my invention herein.

In the accompanying drawings the numeral 5 denotes the body of the urn having a rest 6 at its lower end serving as a means of support, a spout 7 through which the contents of the vessel may be drawn, a basket 8 inserted in the upper part of the body, this basket being perforated at the bottom and within which the coffee or like material is placed, and a cover 9 closing the mouth of the basket. A diffuser 10 also having a perforated bottom may be located within the basket 8, if desired. All of the parts above described are of old and well-known construction, and further description is therefore deemed unnecessary herein. The bottom of the pot is reduced in size forming a depression 11, preferably tapering from a larger dimension at the top to a smaller dimension at the bottom, this depression extending within the flange or rest 6. An opening 12 is formed through the bottom of the depression and a threaded nipple 13 is inserted through this opening, and upon the threaded end of which a heating plate 14 is secured. This nipple has a flange or flanged head 15 resting upon the bottom of the depression 11 and forming a rib of considerable thickness and of less size in diameter than the bottom of the depression for the purpose of forming a circulating chamber 16. The flange 15 has radial openings 17, and the central opening through the nipple forms, in connection with a recess 18 in the heating plate, a heating chamber 19 in said plate.

A fountain 20 is formed to fit within the depression 11, the construction being such that the bottom of the fountain rests upon the flange 15 of the nipple 13 and at the same time the fountain completely fills the depression from the head of the nipple to the top of the depression so that no liquid can enter around the fountain. This fountain is preferably formed of thin metal with an interior chamber 21, and a circulating plate 22 is secured to the bottom of the fountain. This circulating plate in fact constitutes a part of the fountain, and it is removably secured in place, in the preferred form of construction a flange 23 extending from the upper surface of the plate at its periphery, and of a size in diameter to receive the other part of the fountain, being provided with angular slots 28 to receive pins projecting from the side of the fountain. A passage 24 of spiral form extends through the fountain, as clearly shown in Fig. 2, in the preferred form of construction and as shown herein, this passage being located between the plate 22 and the bottom of the other part of the fountain and preferably in the plate itself, in which instance the other part of the fountain forms one wall of the passage.

An inlet passage 25 is formed within a sleeve 26 surrounding a fountain tube 27, which tube is secured to or forms a part of the plate 22, and has a passage extending from the heating chamber 19 to deliver the fluid contents into the baskets 8 and 10. Ports 29 are formed through the wall of the sleeve 26 by means of which the liquid contents of the vessel 5 enter the inlet passage 25 and are conducted to the spirally extending passage 24. After passing several times in a circular path to the periphery of the plate 22 the liquid passes through a port 30 into the circulating chamber 16, through the radial openings 17 into the heating chamber 19 in which it is quickly heated to an extent to cause it to be forced upward through the fountain tube 27. It will thus be noted that the liquid contents of the vessel are located at a considerable distance from the heating chamber 19, so that said contents do not become unduly heated, and in passing from the interior of the vessel to the heating chamber 19 they are constantly subjected to the action of the hotter fluid which is passing up through the fountain tube or which is located in the heating chamber 19. The passage is so devious that the force of the heated liquid within the heating chamber 19 cannot act to stop this flow to the heating chamber, there being much less resistance through the fountain tube 27 and the fluid contents thus easily traveling upward through said tube.

While I have shown and described herein a preferred form of construction of device for carrying out my invention, this construction may be departed from to a greater or lesser extent and yet be within the spirit and intent of the invention, and I do not therefore limit my invention to a device constructed in exact accordance with that shown and described herein.

I claim—

1. A percolator including a vessel having a depression in its bottom and also having a heating chamber opening into said depression, a raised portion in said depression forming a circulating chamber about the mouth of the heating chamber, said raised portion having inlet passages extending from the circulating chamber to the heating chamber, a fountain closing said depression and formed with an outlet passage from the heating chamber and with an inlet passage thereto, and a fountain tube to conduct fluid from the heating chamber.

2. A percolator including a vessel formed with a depression in its bottom, a heating plate having a recess, a nipple having a flanged head located in said depression, said flanged head being smaller in diameter than the depression whereby a circulating chamber is formed about the head, means for securing the heating plate to the projecting end of the nipple and thereby to the vessel, a fountain closing said depression and forming the upper wall of said circulating chamber, said fountain having inlet passages communicating with the circulating chamber and a fountain tube to conduct fluid from said heating chamber.

3. A percolator including a vessel formed with a depression in its bottom, and with a heating chamber opening into said depression, a fountain located in said depression and forming the upper wall of said heating chamber, said fountain having an inlet passage extending in a spiral direction through the fountain and within its body to conduct fluid from the vessel to said chamber, and a fountain tube to conduct liquid from said heating chamber.

4. A percolator including a vessel formed with a depression in its bottom, and with a heating chamber opening into said depression, a fountain closing said depression and overlying the heating chamber, said fountain being formed with an inclosed air chamber therein, a plate removably secured to the bottom of the fountain, said fountain and plate being constructed to provide a passage underneath said air chamber for fluid flowing from the vessel to said heating chamber, and a fountain tube to convey fluid from the heating chamber.

5. A percolator including a vessel formed with a depression in its bottom, and with a heating chamber opening into said depression, a fountain closing said depression and overlying said heating chamber, said fountain being formed with an inlet passage extending vertically at its center and then horizontally therethrough toward the edge thereof into said heating chamber, and a fountain tube to deliver liquid from said heating chamber.

6. A percolator including a vessel formed with a depression in its bottom, and with a heating chamber opening into said depression, a fountain closing said depression and overlying said heating chamber, said fountain being formed with an inlet passage extending vertically therethrough at its center and then horizontally in a spiral direction toward its outer edge and into said heating chamber, and a fountain tube to deliver liquid from said heating chamber.

7. A percolator including a vessel formed with a depression in its bottom, and with a heating chamber opening into said depression, a fountain closing said depression and overlying said heating chamber, said fountain being formed with an inlet passage extending vertically therethrough and then horizontally toward the edge of the fountain and communicating with said heating chamber, and a fountain tube extending upward from the fountain to convey liquid from said heating chamber.

8. A percolator including a vessel formed with a depression in its bottom, and with a heating chamber opening into said depression, a fountain closing said depression and overlying said heating chamber, said fountain being formed with a passage vertically therethrough and also with a passage extending in a spiral direction from said vertical passage to said heating chamber, and a fountain tube extending upward from the fountain to deliver liquid from said heating chamber.

9. A percolator including a vessel formed with a depression in its bottom, and with a heating chamber opening into said depression, a fountain closing said depression and overlying said heating chamber, said fountain being formed with a central opening extending vertically therethrough, said fountain including a plate removably secured thereto, and said fountain and plate being formed to provide a passage between them to conduct liquid from said central opening to the heating chamber, and a fountain tube secured to said plate and projecting upward from said central opening to deliver liquid from said heating chamber.

10. A percolator including a vessel formed with a depression in its bottom, and with a heating chamber opening into said depression, a rib forming a circulating chamber around the mouth of said heating chamber, a fountain closing said depression and resting upon said rib and overlying said heating chamber and circulating chamber, said fountain having a central opening extending vertically therethrough and including a plate secured to the bottom of the fountain, said fountain including the plate being formed with a passage between them extending from said central opening to said circulating chamber, and a fountain tube secured to said plate and extending upward from said central opening to deliver liquid from said heating chamber.

11. A percolator including a vessel having a depression in its bottom, said depression having an opening, a nipple having a flanged head at one end located in said depression and of a size less in diameter than said depression to form a circulating chamber about said head, said nipple projecting through said opening, a heating plate secured to the projecting part of said nipple, said plate having a recess constituting a heating chamber, said flanged head having passages extending from the circulating chamber to the heating chamber, a fountain closing said depression and having an opening extending vertically through the center thereof, a plate removably secured to said fountain, said plate and fountain having a passage between them extending from said central opening toward the outer edge of the fountain, and a fountain tube secured to said plate and projecting upward from said central opening to deliver liquid from said heating chamber.

12. A fountain for a percolator, said fountain including a tube extending therethrough to form one wall of an inclosed air chamber, a plate removably secured to the bottom of the fountain, said fountain and plate being formed with a passage extending from said tube to the periphery of the fountain, and a fountain tube extending through the tube forming one wall of said chamber.

13. A percolator including a vessel having a depression in its bottom, a heating plate having a recess therein, a nipple projecting into the recess in the heating plate, said nipple having a flanged head resting on the bottom of said depression and said plate being secured to the projecting end of the nipple whereby the bottom of the vessel is clamped between the heating plate and head of the nipple, said flanged head being smaller in diameter than the chamber of the depression to form a circulating chamber about the head, the latter having passages formed therein into said heating chamber, a fountain closing said depression and forming the upper wall of the circulating chamber, and a fountain tube to conduct fluid from said heating chamber.

ISRAEL GEFTER.

Witnesses:
 ARTHUR B. JENKINS,
 LOUIS LUCIA.

Copies of this patent may be obtained for five cents each, by addressing the "Commissioner of Patents, Washington, D. C."